June 23, 1942.                    W. R. EADY                    2,287,606

FASTENING DEVICE

Filed July 8, 1940

INVENTOR
*Walter R. Eady.*
BY
*Harness, Dind, Patee & Harris*
ATTORNEYS.

Patented June 23, 1942

2,287,606

UNITED STATES PATENT OFFICE 2,287,606

FASTENING DEVICE

Walter R. Eady, Royal Oak, Mich., assignor to Chrysler Corporation, Highland Park, Mich., a corporation of Delaware Application July 8, 1940, Serial No. 344,365

4 Claims. (Cl. 189—88)

This invention relates to a trim fastening device particularly adapted for securing trim, moulding or the like to parts such as automobile bodies and the like. More particularly, the invention is concerned with a novel method and means providing a continuous, yet detachable, connection between a body portion and the trim.

Another object of the invention is to provide an improved continuous metal fastener for application to a body portion having formed as an integral part thereof the fastener elements designed for snap fastener engagement with suitable openings or sockets in the body portion of the part to which the trim material is applied.

A further object of the invention is to provide an improved metal fastener strip designed for attachment to a body portion including a multiplicity of open crimps so designed that when the crimps are engaged with the body portion or part to which the strip is applied, the portions of the fastener strip between the crimps are caused to lie snugly against the body portion.

Other objects and advantages of the invention will more fully appear from the following description taken in connection with the accompanying drawing in which.

Figure 1:
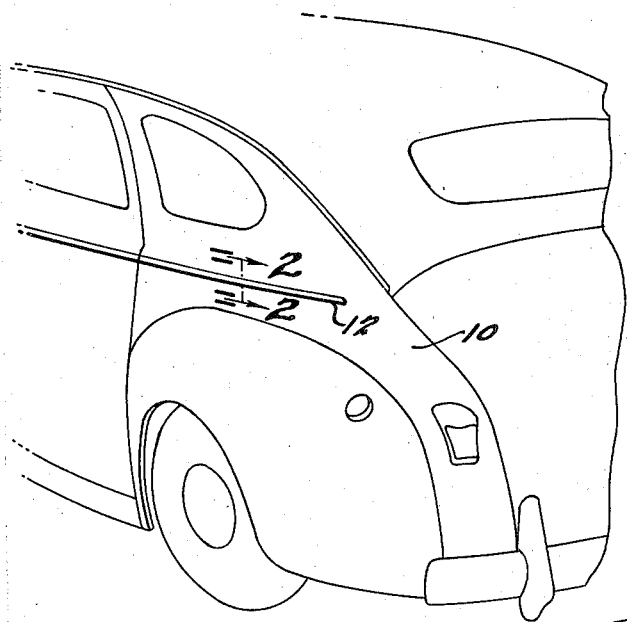
Fig. 1 is a fragmentary perspective view of the assembled molding strip applied to the side of the body.
Figure 2:
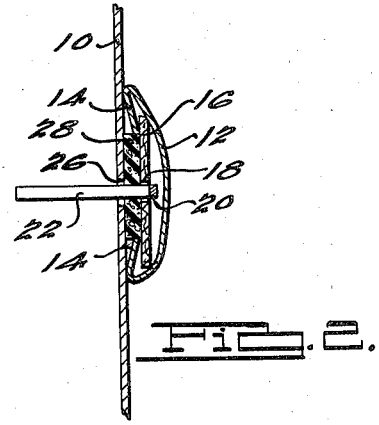
Fig. 2 is a sectional view taken on line 2—2 of Fig. 1 showing the fastening device for holding the molding to the body.
Figure 3:
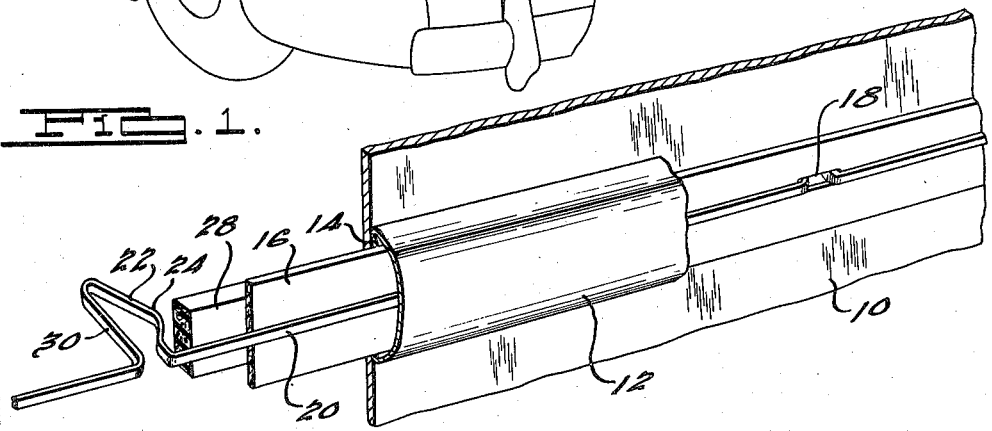
Fig. 3 is a perspective view of the assembled molding strip, parts being broken away and in section.

Referring to the drawing, an automobile body 10 having a molding strip 12 applied thereto. The molding strip 12 is a metallic trim strip, preferably plated or colored, and is shown applied to the side of the automobile at the belt line. The strip 12 is formed channel-shaped having its edges reversely bent inwardly to form holding flanges 14. A strip 16, either heavy cardboard or metal, is received in the channel 12 between the body portion of the channel 12 and the holding flanges 14. The strip 12 has a multiplicity of spaced openings 18 which receive fastening members hereinafter more fully described.

The preferred form of fastening strip consists in a single piece of wire 20 having a multiplicity of open crimps 22 formed at intervals along the length thereof. The crimps 22 are constructed so that they are wider at the mid-portion thereof as indicated at 24. The fastener strip is preferably formed of wire or any other suitable material having a high degree of resilience, the effect of which, when the crimps are maintained under lateral compression after they have been passed through the openings 18 and openings 26 in the body 10, is to cause the portions of the fastener strip to be firmly drawn into contact with the strip 16 and the latter into holding engagement with the flanges 14 pressing the latter at all points into close contact with the body 10.

A sealing strip 28, preferably of sponge rubber, uncured rubber, felt or the like, is applied between the body 10 and the strip 16. When the strip 28 is pressed between the body 10 and the channel 12, the openings 26 are sealed to prevent water from entering the interior of the body through the openings 26.

Figure 6:
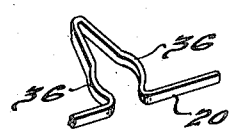
Figs. 4, 5 and 6 are modified forms respectively of fastening crimps.
Figure 5:
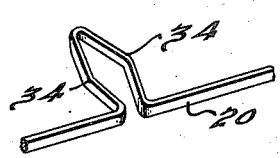
Figure 4:
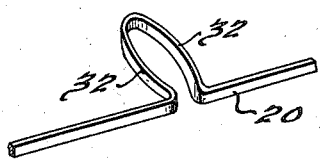

Various forms and shapes of fastening elements may be formed as illustrated in Figs. 3, 4, 5 and 6. In the form shown in Fig. 3 the fastener 22 has one side 30 formed straight and its opposite side bent outwardly adjacent its mid-portion as at 24. In Fig. 4 the sides are gradually curved as shown at 32 with the mid-portion wider than the outer end and the open end. In Fig. 5 the side walls 34 are more angular shaped diverging inwardly from the center to the ends of the fastener. Fig. 6 shows the sides 36 outwardly curved adjacent the base of the fastener with straight inwardly diverging walls at the outer end. It will be understood that the widened mid-portions when forced through the openings 26 will be sprung, partially closing the open end of the fastener until it is fully in the opening then the smaller portion adjacent the inner end of the fastener permits the side walls to assume a tight spring pressed holding engagement with the sides of the opening through which they are inserted.

The parts are assembled by inserting the fastener elements in the openings 18 in the strip 16 and this assembly is then slid in the end of the preformed channel 12 or the flanges may be folded over the edges of the strip 16 after the strip 16 is in position. The sealing strip 28 is then placed over the fastener elements 22 and the entire assembly applied to the body by forcing the spring fasteners through the openings 26. The openings 18 in the holding strip are larger than the free width across the base of the fastener so that the inner ends of the fastener elements are free for spring movement.

The fasteners being formed from a single strip of material makes the parts easier to manufacture and assemble thereby reducing the cost and providing a much more rigid structure with all points of the trim member held tightly in contact with the body portion.

It will be understood that various changes including the size, shape and arrangement of parts may be made without departing from the spirit of my invention and it is not my intention to limit its scope other than by the terms of the appended claims.

I claim:

1. A trim molding assembly comprising a channel member having its edges reversely bent inwardly, a holding strip in said channel between the body of said channel and its inwardly turned edges, and a fastener consisting in an elongated metal strip having a multiplicity of fastener elements formed at spaced intervals along the length of said strip as an integral part thereof, said metal strip extending between said holding strip and the body of said channel with said fastener elements projecting through said holding strip.

2. A trim molding assembly comprising a channel member having its edges reversely bent inwardly, a holding strip in said channel between the body of said channel and its inwardly turned edges, a fastener consisting in an elongated metal strip having a multiplicity of fastener elements formed at spaced intervals along the length of said strip as an integral part thereof, said metal strip extending between said holding strip and the body of said channel with said fastener elements projecting through said holding strip, and a strip of soft deformable material on the outer face of said holding strip, said fastener elements projecting through said deformable material.

3. A trim molding assembly for a panel or the like provided with a plurality of spaced openings comprising a molding strip, a holding member for said molding provided with a plurality of openings for alignment with the openings in the panel to receive the molding, a fastener comprising an elongated metal strip, rectangular in cross section and having a multiplicity of fastener elements formed at spaced intervals along the length of said strip, said metal strip extending between said holding member and said molding with said fastener elements projecting through the openings in said holding member and the aligned openings in the panel.

4. A trim molding assembly for a panel or the like provided with a plurality of spaced openings comprising a molding strip, a holding member for said molding provided with a plurality of openings for alignment with the openings in the panel to receive the molding, a fastener comprising an elongated metal strip, rectangular in cross section and having a multiplicity of fastener elements formed at spaced intervals along the length of said strip, said metal strip extending between said holding member and said molding with said fastener elements projecting through the openings in said holding member and the aligned openings in the panel, and a sealing member between the panel and said holding member.

WALTER R. EADY.